United States Patent [19]
Dethloff et al.
[11] 4,250,560
[45] Feb. 10, 1981

[54] TEXT PROCESSING APPARATUS

[75] Inventors: Jürgen Dethloff, Elbchaussee 239, 2000 Hamburg 52, Fed. Rep. of Germany; Hans-Peter Heyden, Pinneberg, Fed. Rep. of Germany

[73] Assignee: Jürgen Dethloff, Fed. Rep. of Germany

[21] Appl. No.: 915,245

[22] Filed: Jun. 13, 1978

[30] Foreign Application Priority Data

Jan. 16, 1978 [DE] Fed. Rep. of Germany ....... 2801707

[51] Int. Cl.[3] ............................ G06F 1/00; B41J 5/30
[52] U.S. Cl. ........................................ 364/900; 400/68
[58] Field of Search ... 364/900 MS File, 200 MS File, 364/200, 900; 340/711, 799; 400/68

[56] References Cited

U.S. PATENT DOCUMENTS

| | | | |
|---|---|---|---|
| 3,501,746 | 3/1970 | Vosbury | 364/900 |
| 3,610,902 | 10/1971 | Rattenkamp et al. | 364/200 |
| 3,623,012 | 11/1971 | Lowry et al. | 364/200 |
| 3,739,352 | 6/1973 | Packard | 364/200 |
| 3,893,560 | 7/1975 | Heitman et al. | 400/68 X |

*Primary Examiner*—Raulfe B. Zache
*Attorney, Agent, or Firm*—McGlew and Tuttle

[57] ABSTRACT

The apparatus comprises a data storage provided with an electronic control unit to which are connected a retrieving unit, an input unit, and a charge/retrieve switch. The electronic control unit includes an input unit, an output unit, a program storage and a microprocessor. The data storage is provided with a number of preferably equal capacity storage cells, which are preferably divided into two groups, with one group forming a block storage compartment and the other group forming a sheet storage compartment. An indicator is preferably provided to indicate which storage cells are occupied and which are empty. When all those storage cells in the block storage compartment are occupied, additional information can be supplied to any empty cells in the sheet storage compartment, and vice versa. A display unit and a printing mechanism may be connected, through suitable switches, to the data storage. Information can also be transferred from one storage cell in a storage compartment to another storage cell in the same storage compartment or to another storage cell in the other storage compartment. In a further embodiment of the invention, the apparatus is provided with a remote control input, a remote control output, and a buffer storage is provided. This embodiment includes a separator for single data or single characters and retrieving signals, as well as a block address allocator.

31 Claims, 8 Drawing Figures

Fig.1
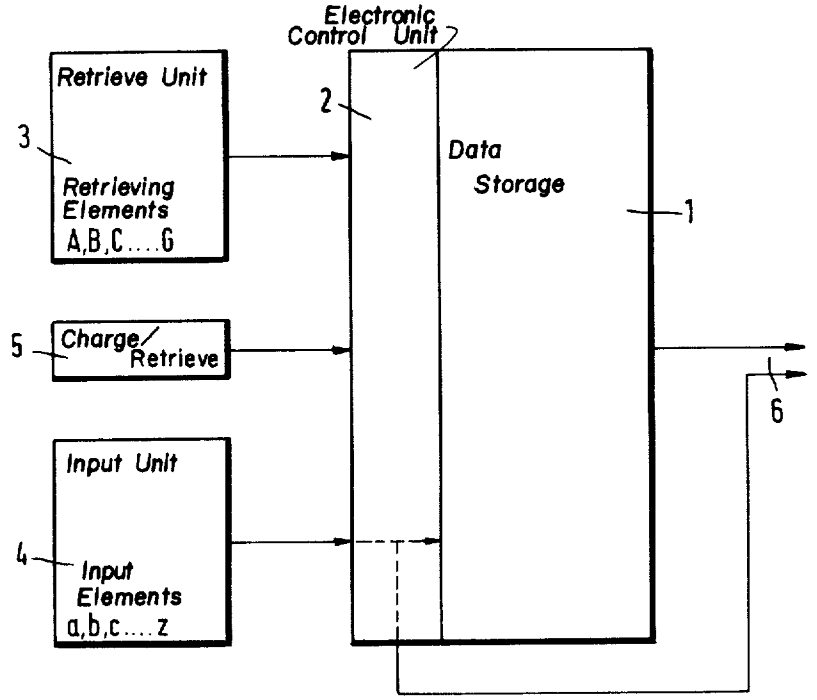
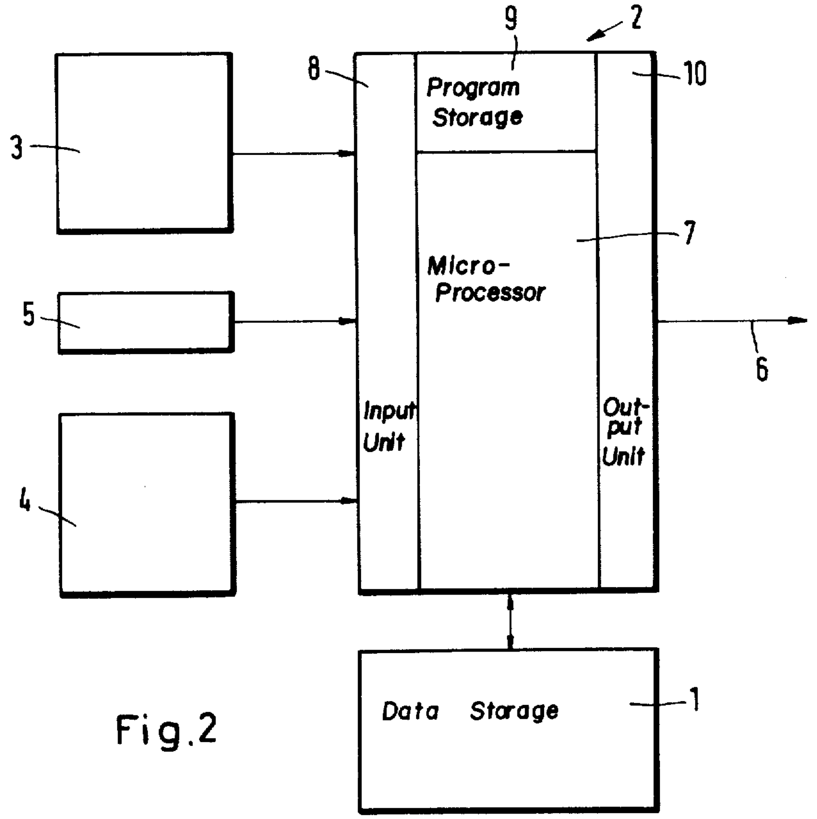
Fig.2

TABLE

| | CHANGE Before | | After | |
|---|---|---|---|---|
| | Initial | Final | Initial | Final |
| A | 0 | 19 | 0 | 19 |
| B | 20 | 29 | 20 | 29 |
| C | 30 | 49 | 70 | 84 |
| D | 50 | 59 | 30 | 39 |
| E | 60 | 74 | 40 | 54 |
| F | 75 | 89 | 55 | 69 |
| G | Empty | | Empty | |

etc.

TEXT PROCESSING APPARATUS

FIELD OF THE INVENTION

This invention is directed to an electrical text processing machine, a data input location, or the like, comprising a data storage, in particular to a device for storing and retrieving data blocks from a storage, with each data block being associated with a respective retrieving element.

BACKGROUND OF THE INVENTION

There are needed, and also known, by way of example, devices, in automatic typewriters, for inserting recurring texts into hand-typed texts. For this purpose, the "fixed" texts are initially stored, by means of a corresponding input equipment, for example, a typewriter keyboard, in a suitable storage. In most cases, a magnetic tape or magnetic discs, with addressable storage blocks, are used. The disadvantage of such devices is, however, that the retrieving of a certain data block takes a relatively long time.

In the teletype writing technique, it is also known to store the identification code of the teletype-writer, and to retrieve it automatically by means of special keys. Such retrieving keys are associated with a specific storage block in storages which have predetermined storage capacities. A change of the storage contents is still possible, because the word length of the respective data does not change when the identifying signal is changed. This also holds true for devices for storing telephone numbers which can be called up over a single key, since these also have a predetermined maximum number of positions, so that, when a telephone number is changed, the capacity of the respective storage block need not be changed.

In contrast to these last-mentioned examples, it is frequently desirable to keep data, such as words, sentences, instructions, etc., ready for quick retrieval by means of a single retrieving process, for example, by pressing a key, and thus also to have the possibility of simply feeding the data or exchanging the data without having to overcome storage problems.

SUMMARY OF THE INVENTION

The invention is directed to the problem of providing a text processing apparatus of the above-indicated type but which permits a simple and safe operation at a high operating speed.

In accordance with the invention, this problem is solved in that the apparatus is provided with an electronic control unit operating in a manner such that, when a charge/retrieve switch is set to "charge", it assigns to each then actuated retrieving element a data storage sub-range with a storage capacity corresponding to at least the amount of data which are assigned, during the duration of the state of actuation of the actuated retrieving element, also to corresponding actuated data input elements of an input device, and that, when the charge/retrieve switch is set to "retrieve", the effect is that the data assigned to the then actuated data input elements can be supplied from the then actuated data storage sub-ranges assigned to then actuated retrieving elements can be supplied to an output, in the order in which the retrieving elements and the data input elements were actuated.

This text processing apparatus, which is preferably a typewriter, permits the operator not only to assign data blocks, in the form of frequently used words, sentences and paragraphs, but also whole pages, to certain retrieving elements and to retrieve them, when needed, by actuating a single retrieving element, and to insert the retrieved data blocks in the continuously written text, or the "flowing text", at the desired point. This not only speeds up the writing process quite considerably, but typographical errors are also avoided. In addition, it permits the operator to store any desired text "under" any retrieving element, to retrieve it again when needed. With this correlation of text and retrieving elements, it is merely necessary to see to it that the total of the available storage capacity is not exceeded, while the size of the data storage sub-range, assigned to a retrieving element, adapts itself automatically to the length of the data block to be stored under the retrieving element, so that it is at least equal to the latter. On the one hand, this provides a favorable utilization of the available storage space and facilitates, on the other hand, the operation of the apparatus when storing a desired data block "under" a desired retrieving element.

The data storage and the electronic control unit can be so designed that, when a data block of greater length is assigned to a retrieving element than corresponds to the capacity of the data storage sub-range originally assigned to this retrieving element, the control unit extends this data storage sub-range, for the new data block, by at least the additional space requirement, adding at least a part of the free space of at least the first of the data storage sub-ranges having a free space and which is closest in a predetermined search order. The electronic control unit assures automatically an exchange of the storage content of the data block adjacent the one to be changed, or of additional adjacent data blocks, by utilizing their free spaces, so that the changed data block has sufficient space available under the corresponding retrieving element, possibly more than the minimum storage space required, while the number of exchange steps remains relatively small, considering possible future changes of the contents and the lengths of the data storage sub-ranges. This reduces the time required for a change of the storage content.

The retrieving elements can be designed in various ways, but it is particularly simple to design these elements as keys.

While the data storage can be fixedly mounted, preferably, it is designed as a plug-in unit. In a further development of the invention, multiple utilization of the retrieving elements is possible, since they can be assigned, by special shift, to one or more data storages.

For certain applications, for example, in the shop floor data collection, it may be of advantage to design the input device as a plug-in unit, since the data which are fed by users of such a unit, for example, shop floor data collection terminal, consists, for a long period of time, of the same selection of unchanged data sequences, and there is no additional input of individual data units over the same input device. The input device thus can be connected only temporarily, by plugging, with the retrieving element/storage combination, when the latter, for example, has to be changed for the first time.

If the storages are charged completely or partly identically in a network of two or more of these text processing apparatuses, identical data sequences can be retrieved by operating retrieving elements, in a transmitting text processing apparatus, over a data remote control in a receiving text processing apparatus, without having to actuate the associated retrieving element in the receiving text processing apparatus.

The data storage can be provided with semi-conductor elements and the control unit can have a microprocessor, which permits a space-saving design.

An even greater protection against a reproduction of false data based on wrongly actuated single data input elements or retrieving elements can be attained if the data storage has, in addition to a block storage compartment with an input and output serving to store the data blocks, also a page storage compartment with an input and output serving to store the text of at least one page, if the input of the block storage compartment can be connected with the input element in one position of the charge/retrieve switch, which is adjustable to two positions, when a retrieving element and an input element are actuated, if the output of the block storage compartment, when a retrieving element is actuated in the other position of the charge/retrieve switch when a retrieving element is actuated, and an input element, when actuated, can be connected with the input of the page storage compartment, if the output of the page storage compartment can be connected with a data output unit, if a charging state detector is assigned to the storage compartments and operable to release, when the storage capacity of one storage compartment is exceeded and there is sufficient free space available in the other storage compartment, all the excess data into the free space of the other storage compartment, and vice versa.

In this design, all data, namely data blocks and single data, which are to be arranged on one page, are written only into the page storage compartment and reproduced in the stored state by means of the output unit, at first in a draft, on a data display unit or on paper, before the final reproduction or clean copy is made. Since the display of the printed draft can be practically synchronous with the writing of data blocks or single characters in the page storage compartment, it is readily possible for the operator to check the text of the page stored in the page storage compartment directly and to correct, if necessary, either by rewriting the entire page or, with a corresponding design of the control unit, by rewriting only the falsely fed-in part of the text before it is typed in final form. The storage space in the data storage is so designed that a free space of one storage compartment is used for storing the data units provided for the other storage compartment, and vice versa, so that the total storage capacity of the data storage can be kept smaller than would correspond to an extreme case occuring rarely in practice, because the data storage compartment and/or the page storage compartment are not fully utilized, either because less text is put out, a page need not be fully written, and/or a free space is usually maintained in the block storage compartment as a reserve. A charging state indicator, acting in dependence on the charging state detector, can be provided to indicate the charging state of the block storage compartment, the page storage compartment, or both.

Preferably, a fixed number of indicator elements is assigned to the block storage compartment and to the page storage compartment, and these indicate the total charging state of the block storage compartment and of the page storage compartment, so that the operator can determine easily if there is still free storage space available in the data storage.

To each indicator element, there can be assigned a predetermined number of storage cells, the indicator elements can be arranged in a row, and the indicator elements in this row can be actuated successively. With this arrangement, the degree of occupation of the block storage compartment and of the storage compartment can be indicated in a simple manner by analog increments.

Provision can be made so that the indicator elements can be actuated continuously from one end of the row in dependence on the occupation of the data storage with data blocks and, from the other end of the row, in dependence on the occupation of the data storage with page text information. This permits determining directly which storage space is occupied and to what extent and how much total storage space is still available, because the position and length of the unlighted groups of indicator elements, between the two lighted groups of indicator elements at the ends of the row, indicate directly the location and length of the available storage space.

This means that the sum of the respective storage contents of the block storage compartment and the page storage compartment are so identified, by the indicator elements, that there is shown the remaining free space of the total capacity, both as to its size and to its proportional correlation with the block storage compartment and the page storage compartment. If all indicators are designed, for example, as discrete lighting elements, and arranged in a row, the indicator elements light up from one end of the row to the center when the block storage compartment is occupied, while the elements light up from the other end of the row also to the center when the page storage compartment is occupied, so that the operator can determine, from the location and length of the group of unlighted indicator elements between the lighted part columns, the available storage space and the occupation of the block storage compartment and the page storage compartment. This design, in connection with the charging state detector and the indicator elements, helps to increase the leeway of the operator both in storing data blocks and in the compilation of entire texts, and to increase the economy, since the described total storage, which serves flexibly and selectively for two tasks, can be kept smaller than the overall volume of two separate storages. The operator is to a great extent free in the selection of the length of the data blocks which it is desired to assign fixedly to the individual retrieving keys in the data register, provided that the operator limits the data to the corresponding shorter page text information, if necessary. Data blocks which have been assigned fixedly to the retrieving elements, however, cannot be overwritten in the composition of the page text information in the page storage compartment.

Additionally, it is advantageous if the output of the page storage compartment can be connected to a data display unit or a printout mechanism. It would thus be possible for the operator to put out the page text information contained in the page storage compartment synchronously with the writing, in the page storage compartment, or only when the writing has been checked by means of the display unit.

Besides, the input of the printout mechanism can be connected over a second reversing switch to the output of the above-mentioned page storage compartment or to a page storage compartment of other such apparatuses. With this, it is possible to have a single printout mechanism for several such apparatuses.

If a data block is retrieved from the data storage, by pressing a retrieving key, in order to supply a data block through the output mechanism, particularly a printing mechanism, it is annoying if the operator must wait for a long time for the feeding of individual signals, for the direct output through the output mechanism, depending on the length of the data block, until the retrieved data block is printed out. These waiting periods can be avoided by arranging, between the data input elements and an output unit, a buffer storage whose contents can be put out in the order of the input, and by operating the data storage, the buffer storage and the output unit at a substantially higher speed than the operating speed of the data input elements by the control unit.

This design has the advantage that new individual characters can already be fed into the buffer storage during the output of a retrieved data block and be retrieved from the buffer storage after the retrieved data block has been put out, so that the operator can actuate the input elements immediately after actuating a retrieving element, after which a very long data block, if necessary, can be fed into the buffer storage. Thus, the total input time and the time for printing out a certain text are reduced. In connection with the operating speed of the apparatus being much higher than the speed at which it is possible for the operator to actuate the retrieving and input elements or keys, not only is the output time reduced, but the output mechanism will synchronize rapidly with the actuation of the input elements, so that the operator can monitor practically immediately the text of individual characters fed in by means of the input elements, and correct it, if necessary, in a manner conventional with a standard typewriter.

The buffer storage can also be arranged between the block storage compartment of the data storage and the output unit. In this arrangement, not only are the constantly fed single characters transferred to the buffer storage, but also the data blocks from the block storage compartments are fed into the buffer storage, in the order in which the input and retrieving elements are actuated, before the characters or data blocks are delivered from the buffer storage. This permits the operator to actuate all input and retrieving elements, such as the keys of the keyboard of the apparatus, continuously in the desired order without interruption and, beyond that, to write in new data blocks into the block storage compartment during the output of a longer data block from the buffer storage.

The buffer storage can be a chronological storage, where the information units are readout in the same order in which they were written in, to make sure that the data blocks and single characters to be delivered are delivered in the order in which the associated retrieving and input elements were actuated. It is also of advantage if the buffer storage is the page storage compartment as, in this way, storage capacity can be saved.

Furthermore, provision can be made that the data block assigned to another retrieving element, by exchange of the storage content, and, in addition, at least one single character, can be assigned to a retrieving element. This permits a simple and rapid assignment of larger amounts of text to a retrieving element.

In a further development, the apparatus can have a data communications input, and the input of the data storage can be selectively connected to the outputs of the retrieving and data input devices or to the data communications input. It is thus possible to select the data storage by use of the local retrieving and data input devices or from a remote station.

If retrieving signals, selectable by means of the retrieving elements, and which are assigned to a data block, and the single data, fed by means of the data input elements, can be fed to a data communications output, a larger data block can be retrieved from the block storage compartment and be supplied to the receiver end, in the second text processing apparatus, even over longer distances, by transmitting the output signals of the data communications output of a first text processing apparatus to the data communications input of a second text processing apparatus, without this data block itself having to be transmitted over the transmission path. Instead, it is necessary to transmit only the much shorter retrieving signals and single data or single signals, compared to a data block, if the desired data block was stored first at the receiver end under the same retrieving signal. This also assures, for long distance transmissions, a relatively short transmission time and a high transmission reliability.

It can also be provided that the data storage has, at its input end, a buffer storage compartment which can be connected, at its output end, with the data communications output and with the input of a separator, for retrieving signals and single data, and that the separator output for single data is connected to the output unit, and the separator output for retrieving signals addresses the block storage compartment of the data storage connected at the output along with the output unit. Thus, the same data can be reproduced at the transmitter end, for example, for control purposes, as at the receiver end, without the operator having to wait a long time until the reproduction of a longer data block is completed.

A further simplification of the text processing apparatus, particularly a typewriter, can be achieved if the contents of the page storage compartment can be transferred to the block storage compartment and assigned to a retrieving element. This simplifies the composition and assignment of a longer text to a retrieving element, particularly for making corrections.

It is also of advantage if a retrieving signal, written-in during the feed-in of the data block in at least one data storage sub-range of a first group of n data storage sub-ranges can retrieve the contents of a data storage subrange, associated with this retrieving signal, of a second group of m data storage sub-ranges when actuating a retrieving element for readout associated with a data storage subrange of the first group, where n is greater than zero and m is greater than zero. Thus, a longer text passage which occurs in several data blocks need be stored only once with its full length, namely, in the data storage sub-range of the first group. This saves storage space and the repeated writing of this longer text passage during charging. Besides, it is also possible to keep certain passages, for example the correct date, separate in the data storage subrange of the first group provided for this purpose. When these passages are changed, all data blocks which contain the corresponding retrieving signal are automatically brought up to date, that is, they are provided with the correct date.

An object of the invention is to provide a text processing apparatus which permits a simple and safe operation at a high operating speed.

Another object of the invention is to provide such a text processing apparatus which is characterized by a much greater flexibility of operation than known text processing apparatuses.

A further object of the invention is to provide such a text processing apparatus in which the components can be designed as plug-in units.

Yet another object of the invention is to provide such a text processing apparatus which is safeguarded against reproduction of false data based on wrongly actuated single data input elements or retrieving elements.

A further object of the invention is to provide such a text processing apparatus including a data storage divided into a block storage compartment containing a plurality of storage cells and a sheet storage compartment also containing a plurality of storage cells.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a block circuit diagram of part of a text processing apparatus with a data storage;

FIG. 2 illustrates the block circuit diagram of FIG. 1 with a schematic representation of the electronic control unit for the storage control of the data storage;

DESCRIPTION OF THE PREFERRED EMBODIMENTS

Figure 3:
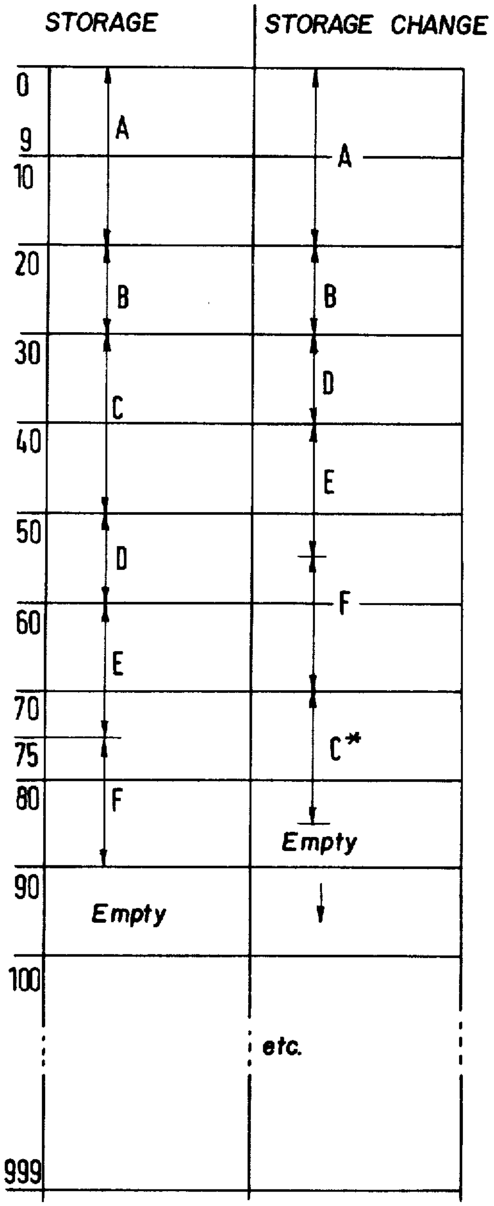
FIG. 3 is an illustration of the organization of the data storage.

Referring to FIG. 1, a data storage 1, which is constituted mainly of semiconductor elements and is supplemented by a magnetic disc for security, can be connected, through an electronic control unit 2, with data input elements a, b, c . . . z of an input device 4 and retrieving elements A, B, C . . . G of a retrieving device 3. A charge/retrieve switch 5 is provided to select the desired operating state, namely, input of data to data storage 1 or output or retrieving of data from data storage 1. When charge/retrieve switch 5 is switched to "charge", that storage cell of data storage 1 into which an information has been written or whose information is to be changed, can be retrieved or selected by the retrieving elements of the device 3. The storage of new data is effected over input device 4. In addition, electronic control unit 2 controls the data flow in data storage 1.

When switch 5 is set to "retrieve", the data storage is separated from input device 4. While data can then be supplied, they are conducted from control unit 2 to output 6, where they are available for further processing.

When switch 5 is thus set to "retrieve", the data of data storage 1, associated with the respective retrieving elements A, B, C . . . G, can be retrieved through retrieving device 3 and made available at output 6. With this, it is possible to have any data blocks, which were first determined by the user as needed, available at output 6 by simply actuating a single retrieving element A, B, C . . . G, where they can be mixed at random with data which were conducted directly from input device 4 to output 6.

Since the individual data blocks of data storage 1 are not, and cannot be, of equal capacity or length, and fixed block capacities or lengths are to be avoided in accordance with the invention, means are provided to "control" or "manage" the storage cells, and these means are contained in electronic control unit 2.

FIG. 2 shows, by way of example, that there can be used, in control unit 2, a microprocessor 7 which is operable through a program storage 9. Control unit 2 also contains an input unit 8 and an output unit 10. By means of the programs stored in program storage 9, microprocessor 7 controls or manages the storage locations of data storage 1, as will be described more fully with reference to FIG. 3, since at least as much storage space is allocated, with each new charge, to the respective retrieving element, as is required for the fed-in data. The amount of the fed-in data is limited only by the total capacity of data storage 1.

FIG. 3 illustrates the control or management of the storage locations or storage cells. During the first charge, the respective information blocks or cells are assigned to the retrieving elements A to F, in data storage 1. The information blocks or cells, which are assigned to the individual polling or retrieving elements, occupy the following locations:

Locations 0–19 to polling element A
Locations 20–29 to polling elements B
Locations 30–49 to polling elements C
Locations 50–59 to polling elements D
Locations 60–74 to polling elements E
Locations 75–89 to polling elements F The other retrieving elements, from the retrieving element G on, and the other storage locations or cells, from No. 90 on, are not yet occupied or are "empty".

When, in this state, charge/retrieve switch 5 is switched again to "charge", and retrieving element C is also actuated again, the information contained in the storage sub-range assigned hitherto to retrieving element C is erased, and the respective storage sub-range is available for receiving new information.

In order to be able to assign to the retrieving element C, by way of example, a longer data block, the new information is written-in, by way of change, into the end of the occupied part of the total storage. The storage cells having been occupied hitherto by the data block of element C now being available are getting used by shifting the subsequent information (assigned to the retrieving elements D, E, F).

In order to be able to find again the information belonging to the respective retrieving elements, after repeated changes and displacements, the address table shown in FIG. 3 can be set up in a fixed position, in which the initial address and the final address of the respective information block is written in to data storage 1 with each loading. If data are to be retrieved by actuating retrieving elements, the correct addresses are read out from the storage table and used to find the desired information block. With each displacement of data, all effected addresses in the address table are brought up to date after the displacement.

This design has the advantage that each user can make available longer or shorter information sequences which may be needed repeatedly for repeated retrieving without outside organizational work or software planning, without any special knowledge or training of the user, so that the user does not have to consider, in such a storage, the selection of a storage location, any addressing specifications, or the amount of the available storage location, apart from the consideration of the capacity of the total storage, and all of these apply also to changes.

If the user has assigned, for example, an information with 25 characters to the "third key from the left" (third retrieving element from the left), and the user no longer needs this information in the future, the user, by simple overwriting by means of the input device, can assign, to this particular key or retrieving element, a new information which contains either fewer positions, for example only seven, or more positions, for example 136. Any vacated storage location or cell is not lost, for the total arrangement, insofar as it remains unused so long as the now shorter information remains assigned to the respective key. Besides, the user need not try to find additional storage space if the overwritten new information is longer than the preceding information.

Figure 4:
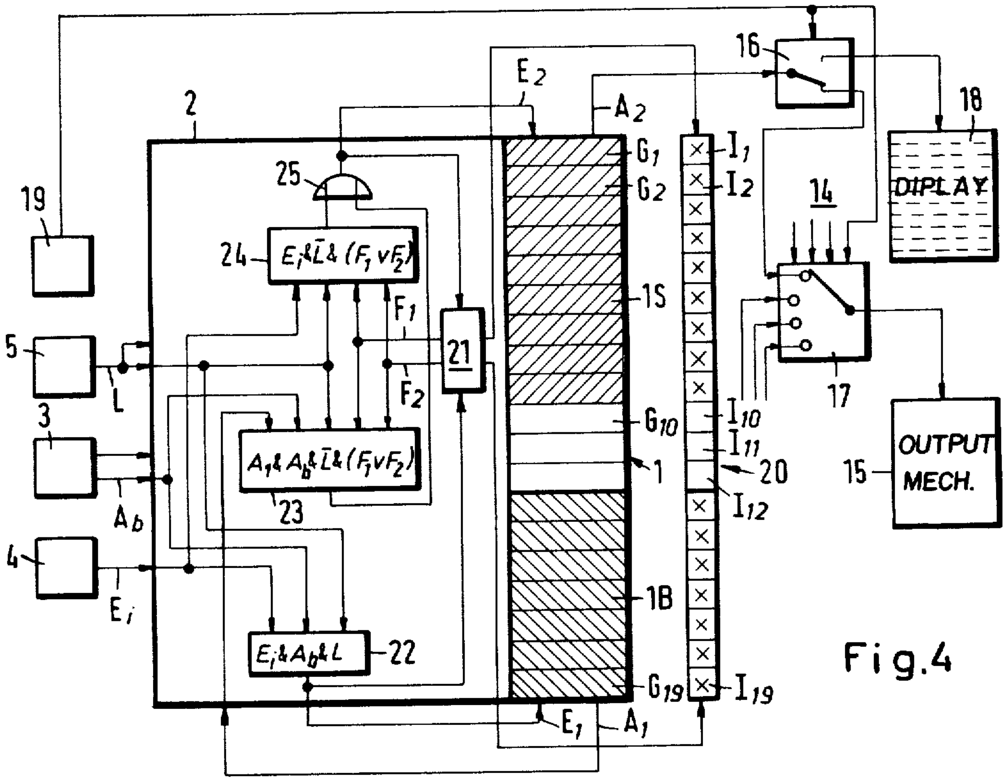
FIG. 4 is a block circuit diagram of a second embodiment of the invention in the form of an electronically controlled typewriter, where several additional typewriter parts can be connected to an output mechanism.

As illustrated in FIG. 4, data storage 1 is subdivided into a block storage compartment 1B and a page storage compartment 1S. Depending on the setting of charge/-retrieve switch 5, and the actuation of devices 3 and 4, data can be fed, through control unit 2 and an input E1, into block storage 1B, so that a predetermined data block, such as words, sentences, paragraphs and/or the text of entire pages, can be fixedly assigned, in block storage compartment 1B, to each retrieving element of retrieving device 3, the storage location control or management being designed as in the embodiment of the invention in FIGS. 1, 2 and 3. The data blocks can again be transferred to page storage compartment 1S, depending on the setting of charge/retrieve switch 5 and the actuation of the retrieving unit 3, from block storage compartment 1B through an output A1 of data storage 1, control unit 2, and an input E2 of data storage unit 1. In addition, single characters can be fed through control unit 2 into page storage compartment 1S, depending on the setting of charge/retrieve switch 5 and the actuation of input device 4.

If page storage compartment 1S contains the entire text to be printed on one or more pages, that is information on one or more sheets of paper, in the correct order, the page text information can be fed from page storage compartment 1S one time or several times over output A2 of data storage 1 to an output unit 14. From output unit 14, the information can be fed, depending on the setting of two reversing switches 16 and 17, to an output mechanism 15, here in the form of a printing mechanism, or to a data display unit 18. Page storage compartment 1S, however, can already be read out while data blocks are transmitted thereto from block storage compartment 1B or single characters are transmitted thereto by means of input device 4. The setting of reversing switches 16 and 17 is here controlled by a selector switch 19 on the control desk of the typewriter.

Reversing switch 17 has additional transmission inputs and control inputs, which are connected to corresponding outputs of additional typewriter parts, so that only one printing mechanism 15 is required for several typewriter parts, and this can be connected successively to all of the typewriter parts. For this purpose, reversing switch 17 can include a priority control or a sequence control, which assures that a typewriter part is connected to printing mechanism 15 only when this typewriter part has been operated in the determined order and after the preceding typewriter part has been operated.

All storage cells of data storage 1, assigned to the individual signals, are subdivided into groups G1 to G19 of equal size, indicated by horizontal lines, where the number of groups can also be larger or smaller than that represented, and the size of a cell can be equal to one of the above-mentioned storage locations. To each group of storage cells, there is then assigned, in an indicator device 20, an indicator element I-1 to I-19, in the same order. Indicator device 20 is so controlled, by a charging state detector 21 in control unit 2, that it displays the charging states of the storage cell groups G-1 to G19. The cross-hatched storage cell groups indicate how many storage cell groups are occupied. In accordance therewith, the respective indicator elements assigned to these groups light up, a lighted indicator element being indicated by an X. Preferably, the indicator elements are light-emitting diodes. Control unit 2, in the embodiment of FIG. 4, contains a reversing device in the form of gate circuits 22, 23, 24 and 25, which are gated in dependence upon the actuation of the units, 3, 4 and the charge/retrieve switch 5.

The mode of operation of the typewriter and of the associated data display unit will now be described. When switch 5 is set to "charge", its output signal L=1. However, when switch 5 is set to "retrieve", and thus not to "charge", its output signal L=0. Signal L is fed to all of the gate circuits 22, 23 and 24. Furthermore, signal L is fed to additional switching elements (not shown) in control unit 2.

When any retrieving element of retrieving device 3 is actuated, a signal Ab=1 appears and, at the same time, a storage address signal combination, assigned to the actuated retrieving element, is fed to control unit 2. If no retrieving element is actuated, the signal Ab=0. Signal Ab is fed to gate circuits 22 and 23.

When any input element of input device 4 is actuated, a signal combination Ei, which is assigned to the actuated input element, appears at its output, and contains at least "one" and otherwise zeroes or only "ones". Thus, for example, it may contain the signal combination 0011 when input element e is actuated. If no input element is actuated, the signal combination Ei=0. This signal combination Ei is fed to the gate circuits 22 and 24.

The output of gate circuit 22 is connected to input E1 of block storage compartment 1B and to a counting input of charging state detector 21. Output A1 of block storage compartment 1B is connected to an input of gate circuit 23 and the output of gate circuit 25, which is an OR-element, to input E2 of page storage compartment 1S and to a second counting input of charging state detector 21. As long as a free space is available in block storage compartment 1B, a signal F1=1 appears at the first output of charging state detector 21, and otherwise, the signal F1=0 appears. As long as a free space is available in page storage compartment 1S, a signal F2=1 appears at the second output of charging state detector 21, and otherwise, F2=0 appears.

At a third output of charging state detector 21, there appears, at each occupation of a storage cell group of data storage 1 through input E2, a new signal combination which indicates the number of storage cell groups occupied through input E2, and this signal is fed to the upper input of indicator device 20. A decoder is contained in indicator device 20 and decodes this signal combination and makes a corresponding number of indicator elements light up in the order I-1 to I-19. At a fourth output of charging state detector 21, there appears, at each occupation of a storage cell group of data storage 1 through input E1, a new signal combination which indicates the number of storage cell groups occupied through input E1, and this signal is fed to the other or lower input of indicator device 20. A second decoder contained in indicator device 20 decodes this signal combination and makes a corresponding number of indicator elements light up in the order I-19 to I-1.

Accordingly, it can be seen, by observing indicator device 20, how many storage cell groups of page storage compartment 1S, as well as of block storage compartment 1B, are occupied and how many storage cell groups of each compartment are still vacant or empty. In the embodiment illustrated in FIG. 4, the storage cell groups G1 to G9 and G13 to G19 are occupied, so that the indicator elements I-1 to I-9 and I-13 to I-19 light up, while the storage cell groups G10 to G12 are empty and the indicator elements I-10 to I-12 do not light up.

Figure 5:
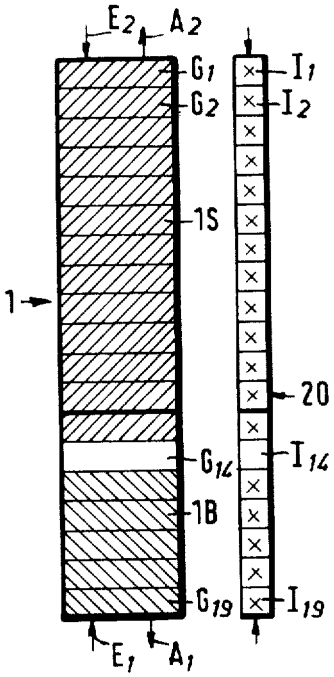
FIGS. 5 and 6 illustrate two other charging states of the data storage shown in FIG. 4, with the corresponding state of a device indicating the charging state.

Correspondingly, in the embodiment shown in FIG. 5, by way of example, the storage cell groups G1 to G13 and G15 to G19 are occupied, while storage cell group G14 is vacant or empty, so that only indicator element I-14 does not light up. In the embodiment illustrated by way of example in FIG. 6, only the storage cell groups G10 and G11 are vacant or empty, so that only the indicator elements I-10 and I-11 do not light up.

Figure 6:
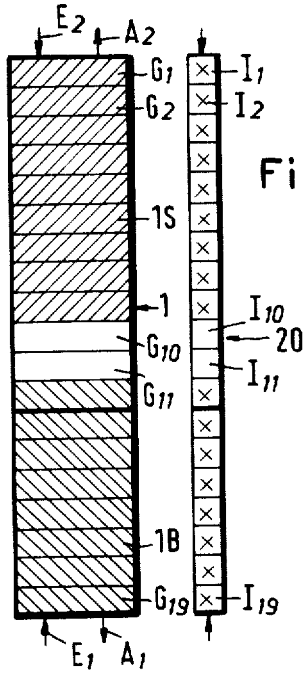

There will now be considered the case where a data block is to be assigned to a freely selectable retrieving element of the retrieving device 3. To this end, charge/-retrieve switch 5 is first set to "charge", to that the signal L=1 appears. Then the desired retrieving element of retrieving device 3 is actuated, so that the signal Ab=1 appears, while an identifying signal combination, fixedly assigned to the actuated retrieving element, is fed to an address allocator (not shown) in control unit 2. Then the required data input elements of input device 4 are actuated in order to compose the desired data block. At each actuation of an input element, another binary signal combination, fixedly assigned to the actuated input element, is produced. Gate circuits 22 to 24 make switching algebraic linkages as indicated in the boxes symbolizing the gate circuits, in accordance with the signal fed to them, where the character "&" represents an AND-operation and the character "v" an OR-operation. This means that only gate circuit 22 is gated and switches through the signal combination. The signal combination is then transmitted over input E1 to a vacant sub-range of block storage compartment 1B and page storage compartment 1S, the latter only if necessary, where the storage address allocator assures that a storage address is assigned to the actuated retriever element of retrieving device 3 after charge-retrieve switch 5 has been reset, at the end of the storage of a data block, this address being fixedly assigned to the sub-range of data storage 1 occupied by the fed-in data block. The storage of additional data blocks, or the overwriting of old data blocks by new data blocks, is effected in a manner such that no free space storage remains between the data blocks, independent of the length or capacity of the data blocks, which can range from several storage cells to several storage cell groups, that data storage 1 is loaded or charged opposite to the order of the storage cell groups, and hence starting with group G19, but adjoins the end of the data blocks, if necessary, as shown in FIGS. 4 to 6. Overwriting of formerly occupied subranges by new data blocks is effected, if necessary, by exchanging the storage content in the sense of a displacement to fill up vacated intermediate ranges or positions, with simultaneous new assignment of the storage addresses to the retrieving elements of retrieving unit 3.

The composition of a text from individual characters, by means of the input elements of input unit 4, and from data blocks, by means of the retrieving elements of retrieving device 3, is effected by transferring data blocks from block storage compartment 1B and direct writing from the input elements of input device 4, into page storage compartment 1S.

There will be considered first the case where a data block is to be transferred from block storage compartment 1B into page storage compartment 1S. For this purpose, that retrieving element of retrieving device 3 is actuated to which the desired data block has been assigned during the storage in block storage compartment 1B, while switch 5 is set to "retrieve" so that Ab=1 and L=1. When charging state detector 21 indicates, by emitting signal F1=1 and/or F2=1, that there is still sufficient storage space available in page storage compartment 1S and/or block storage compartment 1B, considering a maximum admissible data block length, output A1 is connected through gate circuit 23 and OR-element 25 to input E2. Thereby, the data block assigned to the actuated retrieving key is exchanged from block storage compartment 1B to page storage compartment 1S, or, in case page storage compartment 1S has no or an insufficient storage space available, into block storage compartment 1B. In the latter case, the unoccupied range of block storage compartment 1B is also used as a page storage.

Since gate circuit 24 is also gated at L=0 and F1=1 and/or F2=1, the single character assigned to an input element, when the latter is actuated, is also stored in page storage compartment 1S and/or block storage compartment 1B through gate circuit 24, OR-element 25 and input E2. The writing, over input E2, is then effected, again controlled by the storage address allocator, in a manner such that the storage cell groups are occupied in the order G1 to G19.

However, while the storage of data blocks through input E1 can be continued as long as there is storage space available in data storage 1, leaving, however, as much storage space free as is probably necessary for writing a page text through input E2, which can be monitored by means of indicator device 20, charging state detector 21, by blocking gate circuits 22 and 24, prevents additional information being fed into data storage 1 through input E2, if there is no free space available any more in the data storage, and hence, F1=0 and F2=0. This prevents the data blocks, stored in block storage compartment 1B, from being overwritten in the composition of a page text.

By corresponding actuation of selector switch 19, reversing switches 16 and 17 can be so controlled that the page text information, stored in page storage compartment 1S, is either indicated by display unit 18 or printed out by output mechanism 15.

In a further development of electronic control unit 2, the contents of page storage compartment 1S, and thus, for example, an entire typewritten page, can be stored, in the embodiment shown in FIG. 4, "under" a retrieving element of retrieving device 3, in block storage compartment 1S, either for repeated use or for correction.

The speed at which block storage compartment 1B, page storage compartment 1S and output unit 14, particularly printout mechanism 15, can be operated by control unit 2, is selected to be much higher than the speed at which it is possible for an operator to actuate the elements or keys of the devices 3 and/or 4 in the desired order. This assures that the operator does not have to wait to the end of the output of even longer data blocks effected by output unit 14, which had been stored first "under" the retrieving elements of retrieving device 3, and which contain frequently needed texts up to the length of the entire typewritten pages, until the operator can start feeding in new characters by means of the input elements of input device 4, or can start retrieving stored data blocks from block storage compartment 1B for the composition of a continuously printed or reproduced text, because as long as output unit 14 is still engaged in the output of a data block stored in page storage compartment 1S, new characters can already be stored, by means of the input elements directly, or new data blocks can already be stored, by means of the retrieving elements, from block storage compartment 1B into page storage compartment 1S. Because of its high operating speed, the typewriter will finally "catch up" with the operator, so that the output or the printout take place practically simultaneously with the actuation of the input elements or keys of input unit 4, and the operator can check the reproduced text for immediate correction in synchronism with the actuation of the keys. Thus, page storage compartment 1S acts simultaneously as a buffer storage.

Page storage compartment 1S and block storage compartment 1B can be so-called "first-in-first out" storages, where the addressing of the storage locations and the access to the storage locations, respectively, can be effected directly in such a manner that the written information units can be read out continuously in the same order in which they were written-in. Instead, there can be used a shift register whose contents are continuously shifted, and the printout mechanism can be so controlled that it stops with vacancies in the shift register and prints out no more information.

It is also possible to connect output A1 of block storage compartment 1B directly with the input of reversing switch 16, and to design control unit 2 so that only single characters are stored intermediately in page storage compartment 1S, while the single characters are read out during the output from page storage compartment 1S and the data blocks from block storage compartment 1B, in the order in which they were fed in. With this arrangement, page storage compartment 1S acts as a buffer storage for the single characters and block storage 1B acts as a buffer storage for the data blocks during the output. The buffer storage defined as the page storage compartment is thus between the block storage and the input device. The sub-range addresses assigned to the actuated retrieving elements of retrieving device 3 need only be stored intermediately until the previously retrieved data blocks are put out. This requires only a small intermediate address storage compartment, whose capacity is smaller than the additional storage capacity of the page storage compartment required to receive the data blocks. The control unit has the effect that the connection between output unit 14, on the one hand, and the page storage compartment 1S or the block storage compartment 1B, on the other hand, is established only after the output of a data block or a single character is completed.

For a better understanding of the invention, an exemplary procedure will now be outlined utilizing the embodiment of the invention shown in FIG. 1. It is assumed, for this example, that the input device 4 is an alpha numeric keyboard which is known in the art and closely resembles the keyboard of the standard typewriter. The input elements of the input device are the separate keys of the keyboard. The retrieving device 3 will also be assumed to be a keyboard having a plurality of keys which is separate from the alphanumeric keyboard comprising input device 4. Charge/retrieve switch 5 is positioned at a convenient location on the device which also carries the two keyboards 4 and 3. When the device is being operated by, for example, a secretary, to produce a printed page in the output mechanism 15, the charge/retrieve switch 5 is maintained in its "retrieve position" which is considered to be the normal and usual operating position of this switch. Before initiating the production of a text, however, the secretary may first wish to charge or assign certain standard passages to various retrieve elements or keys of the retrieve device 3. Such phrases as "Very truly yours" which are repeatedly used by a secretary are adapted for such charging so that, when such a phrase is required in the composition of a letter, the secretary may merely press the corresponding retrieve element or key of the retrieve device 3 which has been previously labelled by him or her. Due to the flexible size of the storage compatments which can be assigned to each of these retrieve elements, not only short phrases but also whole paragraphs or even whole pages can be assigned to a single retrieve element. This is, of course, useful where such paragraphs or pages are repeatedly used, for example, in the composition of contracts and the like.

In setting up the device, the secretary will first operate the charge/retrieve switch 5 to place it in its "charge position". After this operation, the secretary will activate a single retrieve element or key on the retrieve device 3 into which she will place the standard paragraph or phrase which, in this application, has been termed the "sub-range". At this point, the secretary will type in this standard paragraph or phrase which can be of any length limited only by the total capacity of the data storage 1. After finishing the insertion of this sub-range, the secretary will de-activate the charge/retrieve switch 5, that is, move it into its "retrieve " position. This operation defines the termination of the data range which is now associated with the retrieve element or key which had been pressed. At this point, for practical purposes, the secretary will make up a label and physically affix it to the retrieve element she had selected for this standard phrase or paragraph. One advantage of the invention is that no coded correlation is required for deciding which standard paragraph or phrase is related to which retrieve element since the writing on the label is selected by the secretary for his or her own understanding. After having "charged" any number of retrieve elements, the secretary may now proceed with the production of a full text.

The device now having switch 5 in its "retrieve" position, the secretary will begin typing out a text using the input device which it will be recalled, is in this example, an alphanumeric keyboard. Each typed key, that is, each activated input element will be recorded and reproduced in a data storage cell of the page storage compartment 1S. When the secretary comes to a point in which the text at which one of the standard phrases or paragraphs is to be utilized, the secretary merely activates the retrieving element or key on the keyboard 3 corresponding to that standard phrase or element. At this point, the device of FIG. 4, functions to transfer this standard phrase or paragraph from the block storage compartment 1B to the page storage compartment 1S in the form of a retrieving signal or code. Since it is not economical to reproduce the entire standard paragraph or phrase in both the block and page storage compartment, such a code is utilized. While the code is actually recorded in a corresponding data storage cell of the page storage compartment 1S, the total information held in the retrieved element corresponding to that code is reproduced in the output mechanism 15 through suitably provided means which are known in the art. Such means are programmed to read the code, recognize that it is a code, obey instructions concerning where to find the information in the block storage compartment 1B, and transfer that found information to the output.

When the page storage compartment is used as the input device, however, the sub-range length is already defined by the length of data contained in the page storage compartment. Thus, the charge/retrieve switch being placed into its "charge" position defines the beginning of the sub-range, the end of the sub-range is determined electronically by the end of the data in the page storage compartment which can automatically change the position of charge retrieve switch 5 into its "retrieve" position.

Figure 7:
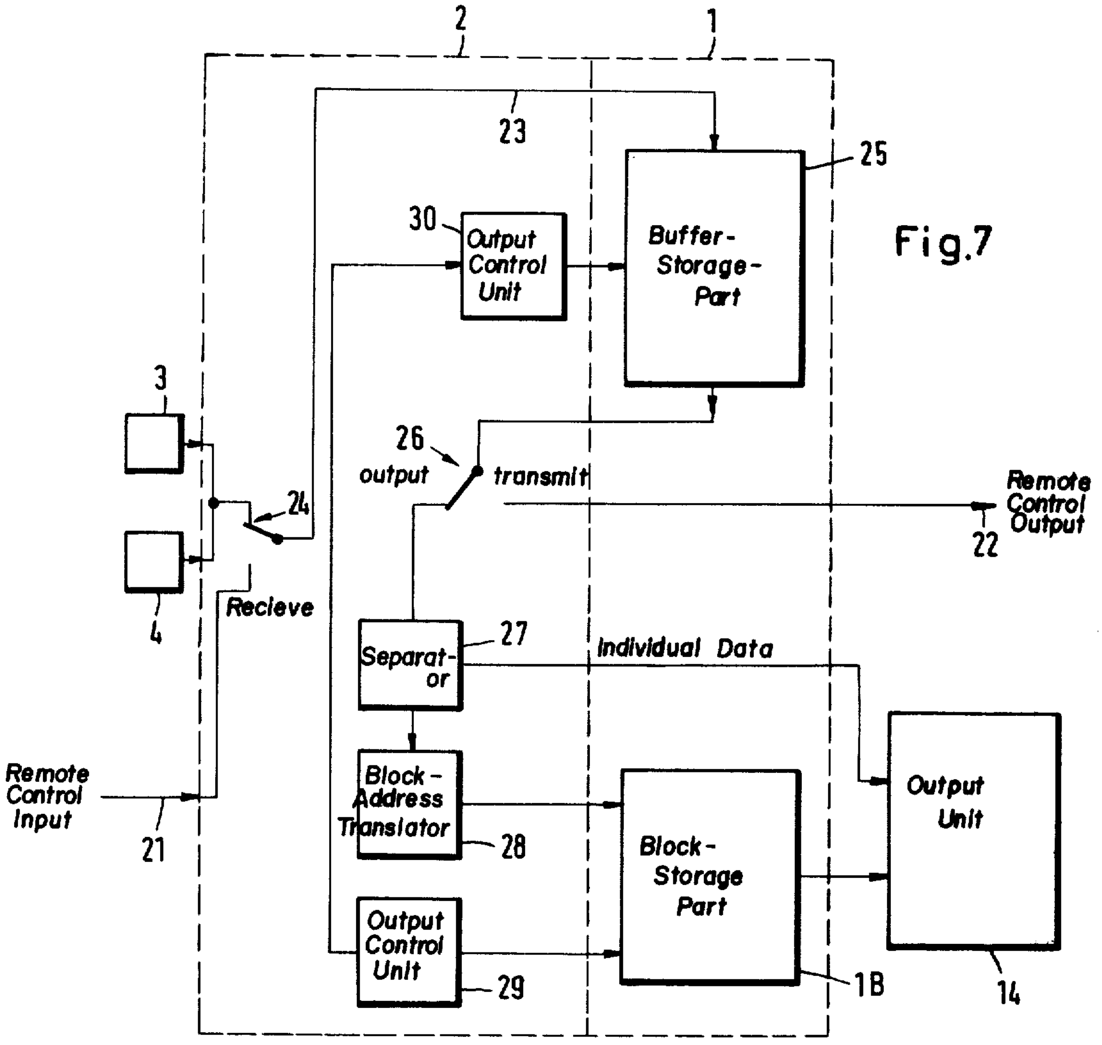
FIG. 7 is a block circuit diagram of another embodiment of the invention.

FIG. 7 shows another embodiment of a text processing apparatus which has a data communications or data remote control input 21' RC and a data communications or remote control output 22' RC. Input 23 of data storage 1 can be connected selectively, through a reversing switch 24, with the output of the retrieving and data input devices 3, 4, on the one hand, and data communications remote control unit 21 RC on the other hand. At this input end, data storage 1 has a buffer storage compartment 25 which can be connected, at its output and through a second reversing switch 26, to remote control output 22 RC or to the input of a separator 27 for single data or single characters and retrieving signals. A block address allocator 28 is connected to the output of separator 27. Allocator 28 translates the retrieving signals, fed in by means of retrieving device 3, of the local or remote text processing apparatus, each of which is assigned to a respective retrieving element A, B, C . . . G, into a block address, under which a data block has been stored previously, in accordance with the embodiment of FIG. 1. Block address allocator 28 selects the respective block storage location in block storage compartment 1B, so that the corresponding data block, controlled by an output control unit 29, can be read out and fed to output unit 14. Output unit 14 contains a display unit and/or an output mechanism in the form of a printing mechanism, the same as in the embodiment shown in FIG. 4.

From the separator output for single data, or single characters, the single data fed by means of input unit 4 into the local or remote text processing apparatus are supplied directly to output unit 14. However, it is also possible to feed the single data and data blocks to output unit 14 through a page storage compartment, like the page storage compartment 1S shown in FIG. 4. The output control unit 29 releases, in the position "output" of reversing switch 26, the output of the addressed data block to output 14, when a retrieving signal arrives. As soon as block storage output control unit 29 is in operation, it causes the buffer storage output control unit 30 to stop. The block storage output control unit 29 completes its operation as soon as the addressed data block has been put out, and releases again the operation of the buffer storage output control unit 30. In the position "transmit" of switch 26, the contents of buffer storage 25 are fed to remote control output 22 RC.

With this arrangement, output unit 14 receives all the data, including single data and data blocks, in order to subject the data, for example, to a visual examination, while only the very short retrieving signals and single signals or single data, compared to the data blocks, are fed to the remote control output 22 RC. In the receiving text processing apparatus, the short signals are fed, through remote control input 21 RC, effecting, in the position "receive" of reversing switch 24 and in the position "output" of reversing switch 26, the output of the total data, in the form of the data blocks and of the transmitted single data, first assigned to the transmitted retrieving signals. This presupposes that the same data blocks have been stored before-hand in the block storage compartments of all interconnected text processing apparatuses "under" the same retrieving signals, but it reduces the required transmission time and the feeding time considerably, so that a transmission path can be utilized for several purposes or can be utilized more frequently. The transmission path can also be used with advantage in the plant itself in connection with internal networks, since identical information sequences, or data blocks, are frequently used internally.

Figure 8:
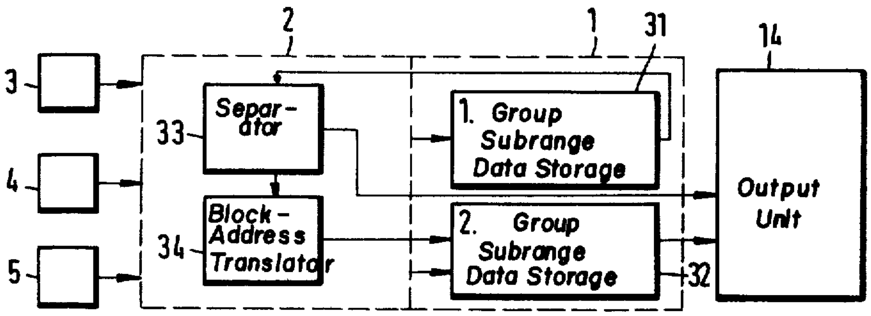
FIG. 8 is a block circuit diagram of still a further embodiment of the invention.

FIG. 8 illustrates an embodiment of the processing apparatus where, instead of a longer information portion, which is required in identical form in different data blocks, a shorter retrieving signal is written during the writing-in of a data block "under" a retrieving element of retrieving device 3 in the data storage sub-range of a first group 31 of data storage sub-ranges assigned to this retrieving element, by actuating corresponding input elements of device 4. In a data storage sub-range of a second group 32 of data storage sub-ranges, whose address is assigned to this retrieving signal and to another retrieving signal in device 3, this information portion is written during the charging operation after actuation of this retrieving element and of the input elements of device 4 assigned to the desired longer information portion.

If the retrieving element assigned to the stored data block containing the retrieving signal is actuated, in output operation with switch 5 in the position "retrieve", the associated data storage sub-range of the first group 31 is read out. This read out, or retrieving, of all data storage sub-ranges of the first group 31 is effected through a separator 33 in control unit 2. Separator 33 feeds all retrieving signals, contained in one or several data blocks, to an address allocator 34, and feeds all other block data, in the order in which they were put out by the data storage sub-range of the first group 31, directly to output unit 14. The address allocator then addresses the data storage sub-range of the second group 32, which is assigned to the retrieving signal determined by separator 33, so that this data storage sub-range is also read out and its contents are fed to output unit 14. During retrieving of the contents of the data storage sub-range of the second group 32, the output of the data from the data storage sub-range of the first group 31 is interrupted and then switches back to retrieving the data storage sub-range of the first group 31, until the output is completed.

With this arrangement, a longer text portion, which occurs in several data blocks, need be stored only once in full length, namely, in a data storage sub-range of the first group 31. This saves storage space and the repeated writing of this longer text portion during charging. Besides, it is possible to keep certain up to data text portions, for example, the correct date, separate in the data storage sub-range of the first group 31 provided for this purpose. When these up to date text portions are changed, all data blocks which contain the respective retrieving signal are automatically brought up to date, for example, with the correct date.

It should be noted that a plurality of data storages can be provided for a single retrieving device. When two data storages, for example, are provided for a single retrieving device, when a a single retrieving element is selected, this corresponds to two distinct sub-ranges, one from each data storage. A simple selection switch may be provided for deciding which of these sub-ranges is to be used. An example of the usefulness of this embodiment of the invention is, for example, when standard phrases are to be translated from one language into another. If a plurality of standard phrases, for example is charged into a first data storage in the English language, a corresponding plurality of standard phrases can be charged into the other data storage in another language, such as French. An operator who can only understand English can thus compose a letter by assembling a plurality of these standard phrases and selecting their output from the French language data storage rather than from the English data storage.

It should be noted that the buffer storage explained with reference to FIG. 7 above is a first-in, first-out storage, that is, a "chronological storage".

While specific embodiments of the invention have been shown and described in detail to illustrate the application of the principles of the invention, it will be understood that the invention may be embodied otherwise without departing from such principles.

What is claimed is:

1. In a text processing apparatus including a data storage having an input and an output and operable to receive information sequences, as variably-sized data blocks, and which data blocks can be retrieved, to form a total information, in the form of a total text, by operation combination, an electronic control unit connected to the data storage, a charge/retrieve switch connected to said electronic control unit and operable from a "retrieve" position to a "charge" position and back; an input device connected to said electronic control unit and comprising input elements; and a retrieving device connected to said electronic control unit and comprising said retrieving elements; said electronic control unit, when said charge/retrieve switch is set to the "charge" position, assigning, to each actuated retrieving element during actuation thereof, a sub-range of said data storage with a storage capacity corresponding to at least the amount of data assigned to said data storage by actuation of the corresponding input elements, and said electronic control unit, when said charge/retrieve switch is reset to the "retrieve" position, operating to feed, to said data storage output, the data assigned to the then actuated input elements and the data blocks from the subranges of said data storage assigned to the then actuated retrieving element, in the order of the actuation of said retrieving and input elements.

2. A text processing apparatus, as claimed in claim 1, in which said data storage and said control unit are operable in a manner such that said control unit, during a new assignment, to a retrieving element, of a data block of greater length than corresponds to the capacity of the sub-range of the data storage originally assigned to such retrieving element, expands the data storage sub-range, for the new data block, by at least the additional space requirement.

3. A text processing apparatus, as claimed in claim 2, wherein said additional space requirement is obtained by adding at least a part of the free space of at least the first of the data storage sub-ranges having a free space, arranged next in a predetermined search order.

4. A text processing apparatus, as claimed in claim 1, in which each retrieving element is an operating key.

5. A text processing apparatus, as claimed in claim 1, in which said data storage is constituted, at least in part, as a plug-in unit.

6. A text processing apparatus, as claimed in claim 1, in which at least one of said input device and said retrieving device is constructed as a plug-in unit.

7. A text processing apparatus, as claimed in claim 1, including a plurality of said data storage; and means to connect said retrieving elements selectively with said plural data storages.

8. The text processing apparatus, as claimed in claim 1, including a data remote control connected to said electronic control unit to control the data storage subranges associated with said retrieving elements.

9. A text processing apparatus, as claimed in claim 1, in which said data storage is constituted, at least in part, by semiconductor elements.

10. A text processing apparatus, as claimed in claim 1, in which said electronic control unit includes a microprocessor.

11. A text processing apparatus, as claimed in claim 1, in which said input device is directly connectable with said data storage output.

12. A text processing apparatus, as claimed in claim 1, including means operable to assign that data block assigned to one retrieving element to another retrieving element by transferring the corresponding storage content together with at least one single additional unit.

13. A text processing apparatus, as claimed in claim 1, including a remote control input; and means selectively operable to connect the input of said data storage to either the outputs of said input and retrieving devices or to said remote control input.

14. A text processing apparatus, as claimed in claim 13, including a remote control output connected to said electronic control unit; and means connected to said remote control output selectively operable to transmit retrieving signals, set by said retrieving elements and which are assigned to a data block, as well as single data, supplied by said input elements, to said remote control output.

15. A text processing apparatus, as claimed in claim 14, including a buffer storage compartment at the input of said data storage; a separator for retrieving signals and single data; means selectively operable to connect the output of said buffer storage compartment to said remote control output or to an input of said separator; said separator having an output for single data connected to said output unit and having another output for retrieving signals; said latter output of said separator addressing said block storage compartment of said data storage; and means connecting the output of said block storage compartment with said output unit.

16. A text processing apparatus, as claimed in claim 1, in which a retrieving signal, written-in in at least one data storage sub-range of a first group of n data storage sub-ranges during the input of a data block can retrieve the contents of a data storage sub-range, assigned to such retrieving signal, of a second group of m data storage sub-ranges when a retrieving element assigned to a data storage sub-range of the first group is actuated; where n is greater than 0 and m is greater than 0.

17. A text processing apparatus, as claimed in claim 1, in which said data storage comprises a block storage compartment serving to store data blocks and having a block storage input and a block storage output, and a page storage compartment serving to store the text of at least one page, having a page storage input and a page storage output; said block storage input, in the "charge" position of said charge/retrieve switch and when a retrieving element and an input element are actuated, being connectable to the actuated input element; said block storage output in the "retrieve" position of said charge/retrieve switch, when a retrieving element is actuated, being connectable with the page storage input and, when an input element is actuated with said charge/retrieve switch still being in the "retrieve" position, being connectable with said page storage input; a data output unit, means selectively operable to connect said page storage output with said data output unit; and a charging state detector connected to the block storage compartment and said page storage compartment and operable, when the storage capacity of one of said block and page storage compartments is exceeded, and there is sufficient free space available in the other of said block and page storage compartments, to release the excess information into the free space of said other of said block and page storage compartment and vice versa.

18. A text processing apparatus, as claimed in claim 17, including a charging state indicator operatively associated with said charging state detector and controlled by said charging state detector.

19. A text processing apparatus, as claimed in claim 18, in which said charging state indicator includes a fixed number of indicator elements corresponding to the total storage capacity of said block storage compartment and said page storage compartment; said indicator elements indicating the total charging state of said block storage compartment and said page storage compartment.

20. A text processing apparatus, as claimed in claim 19, in which said data storage includes a plurality of data storage cells; each of said indicator elements being assigned to a predetermined number of said storage cells; said indicator elements being aligned in a column and being actuated successively within said column.

21. A text processing apparatus, as claimed in claim 20, in which said indicator elements are actuable continuously from one end of said column in dependence on the occupation of said data storage with data blocks and, from the other end of said column, in dependence on the occupation of said data storage with page text information.

22. A text processing apparatus, as claimed in claim 17, in which said data storage includes a plurality of data storage cells arranged in said block storage compartment and in said page storage compartment and, when the storage capacity of said block storage compartment is exceeded, storage cells of said page storage compartment can also be overwritten with excess block information under the control of said charging state detector.

23. A text processing apparatus, as claimed in claim 17, including a data display unit and a printout mechanism; and a reversing switch selectively operable to connect said page storage output to either said data display unit or said printout mechanism.

24. A text processing apparatus, as claimed in claim 23, including at least one additional text-processing apparatus with at least one additional page storage compartment serving to store the text of at least one page; said print-out mechanism having an input; a second retrieving switch selectively operable to connect said print-out mechanism input to said page storage output or to said at least one additional page storage compartment of said at least one additional text-processing apparatus.

25. A text processing apparatus, as claimed in claim 17, including a buffer storage arranged between said input elements and said output unit; the contents of said buffer storage being put out in the order of the input thereof; said data storage, said buffer storage and said output unit being capable of operation at a speed substantially higher than the operating speed of said input elements through said control unit.

26. A text processing apparatus, as claimed in claim 25, in which said buffer storage is arranged between said block storage compartment and said output unit.

27. A text processing apparatus, as claimed in claim 25, in which said buffer storage is a chronological storage.

28. A text processing apparatus, as claimed in claim 25, in which said buffer storage is constituted by said page storage compartment.

29. A text processing apparatus, as claimed in claim 17, including means operable to transfer the contents of said page storage compartment to said block storage compartment and to assign the transferred contents to a retrieving element.

30. A text processing apparatus, as claimed in claim 1, wherein said input device comprises a page storage compartment of said data storage, said page storage compartment comprising a plurality of data storage cells, each of said data storage cells comprising one of said input elements.

31. A text processing apparatus, as claimed in claim 1, wherein said input device comprises a keyboard and each of said input elements comprises an operating key.

* * * * *